United States Patent
Philpott

(10) Patent No.: US 10,309,470 B1
(45) Date of Patent: Jun. 4, 2019

(54) BRAKE CALIPER ASSEMBLY HAVING A RETAINER BRACKET

(71) Applicant: ArvinMeritor Technology, LLC, Troy, MI (US)

(72) Inventor: Daniel Philpott, Goodrich, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 15/910,177

(22) Filed: Mar. 2, 2018

(51) Int. Cl.
F16D 65/00 (2006.01)
F16D 55/22 (2006.01)
F16D 65/095 (2006.01)
F16D 55/00 (2006.01)

(52) U.S. Cl.
CPC ......... F16D 65/0075 (2013.01); F16D 55/22 (2013.01); F16D 65/0006 (2013.01); F16D 65/0081 (2013.01); F16D 65/095 (2013.01); F16D 2055/002 (2013.01); F16D 2055/0037 (2013.01)

(58) Field of Classification Search
CPC ...... F16D 55/00; F16D 55/226; F16D 55/228; F16D 65/0043; F16D 65/0977

USPC .......... 188/73.1, 73.31–73.37, 205 A, 218 A
See application file for complete search history.

(56) References Cited

U.S. PATENT DOCUMENTS

| | | | |
|---|---|---|---|
| 6,302,243 B1 * | 10/2001 | Ruiz | F16D 55/228 188/73.1 |
| 7,341,130 B2 * | 3/2008 | Samuelsson | F16D 55/00 188/218 A |
| 8,857,575 B2 * | 10/2014 | Philpott | F16D 65/0977 188/218 A |
| 9,068,610 B2 * | 6/2015 | Philpott | F16D 65/0043 |
| 10,131,327 B2 * | 11/2018 | Thomas | F16D 55/00 |
| 2008/0110707 A1 * | 5/2008 | Kromer | F16D 65/00 188/218 A |
| 2017/0023082 A1 * | 1/2017 | Morris | F16D 55/226 |

* cited by examiner

*Primary Examiner* — Christopher P Schwartz
(74) *Attorney, Agent, or Firm* — Brooks Kushman P.C.

(57) ABSTRACT

A brake caliper assembly having a housing assembly, a brake pad assembly, a pad shield, and a retainer bracket. The retainer bracket may include at least one protrusion that may engage an abutment surface of the pad shield to limit the axial displacement of the retainer bracket relative to the pad shield.

20 Claims, 5 Drawing Sheets

BRAKE CALIPER ASSEMBLY HAVING A RETAINER BRACKET

TECHNICAL FIELD

This disclosure relates to a brake caliper assembly having a retainer bracket.

BACKGROUND

A brake caliper assembly including a retainer bracket is disclosed in U.S. Pat. No. 8,857,575.

SUMMARY

In at least one approach, a retainer bracket for a brake caliper assembly is provided. The retainer bracket may include a first mount having a first end surface, a second mount having a second end surface, and an intermediate portion extending between the first and second mounts. The intermediate portion may include a channel, a first protrusion, and a second protrusion. The channel may extend longitudinally along a central axis of the intermediate portion. The channel may form a channel depression in a top surface of the intermediate portion and an opposing channel protrusion in a bottom surface of the intermediate portion. The first protrusion may be disposed at a first lateral region of the intermediate portion and may extend from the top surface. The second protrusion may be disposed at a second lateral region of the intermediate portion opposite the channel from the first protrusion.

In at least one approach, a brake caliper assembly is provided. The brake caliper assembly may include a housing assembly having an opening, a brake pad assembly disposed in the opening, a pad shield extending across the opening, and a retainer bracket. The pad shield may include a first span, a second span, and a third span. The first span may be disposed in the opening and may have a first engagement surface that may face toward the brake pad assembly. The second span may be disposed in the opening and may be spaced apart from the first span. The second span may have a second engagement surface that may face toward the brake pad assembly. The third span may be disposed between and may be spaced apart from the first span and the second span. The third span may have a third engagement surface that may face away from the brake pad assembly. The retainer bracket may secure the pad shield to the housing assembly and may engage the first, second, and third engagement surfaces.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
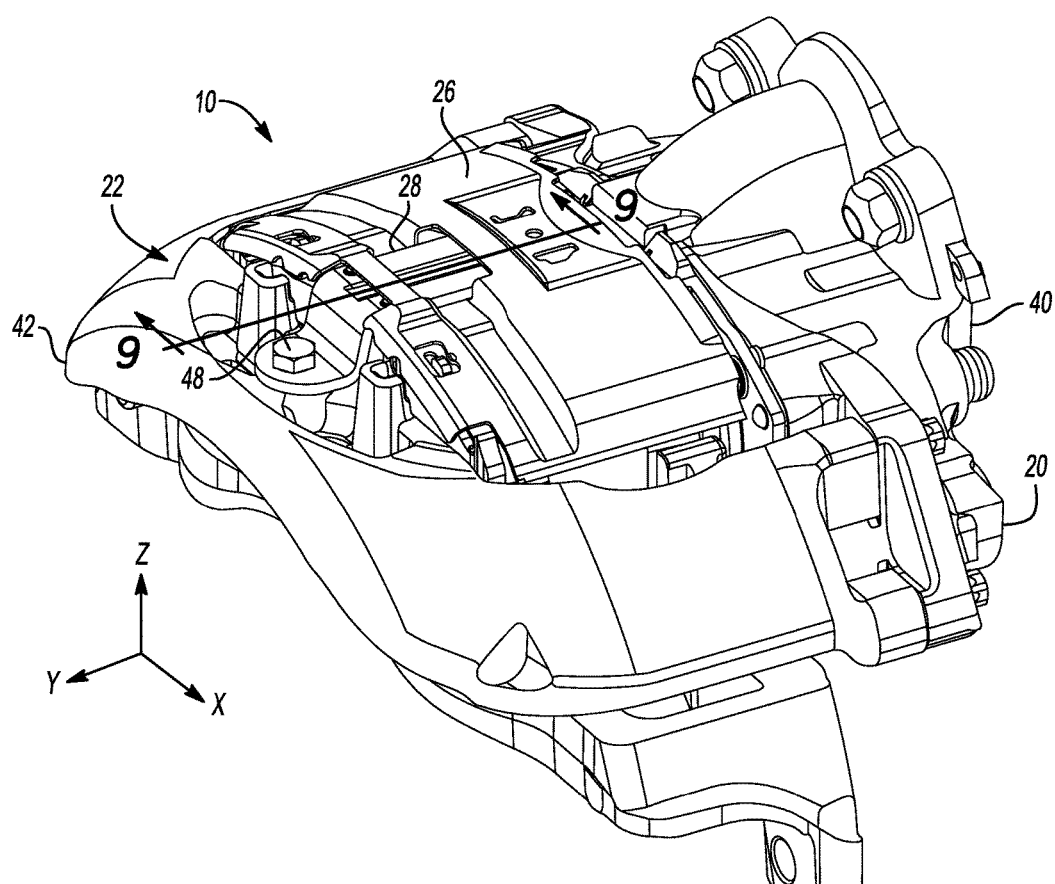
FIG. 1 is a perspective view of a brake caliper assembly.
Figure 2:
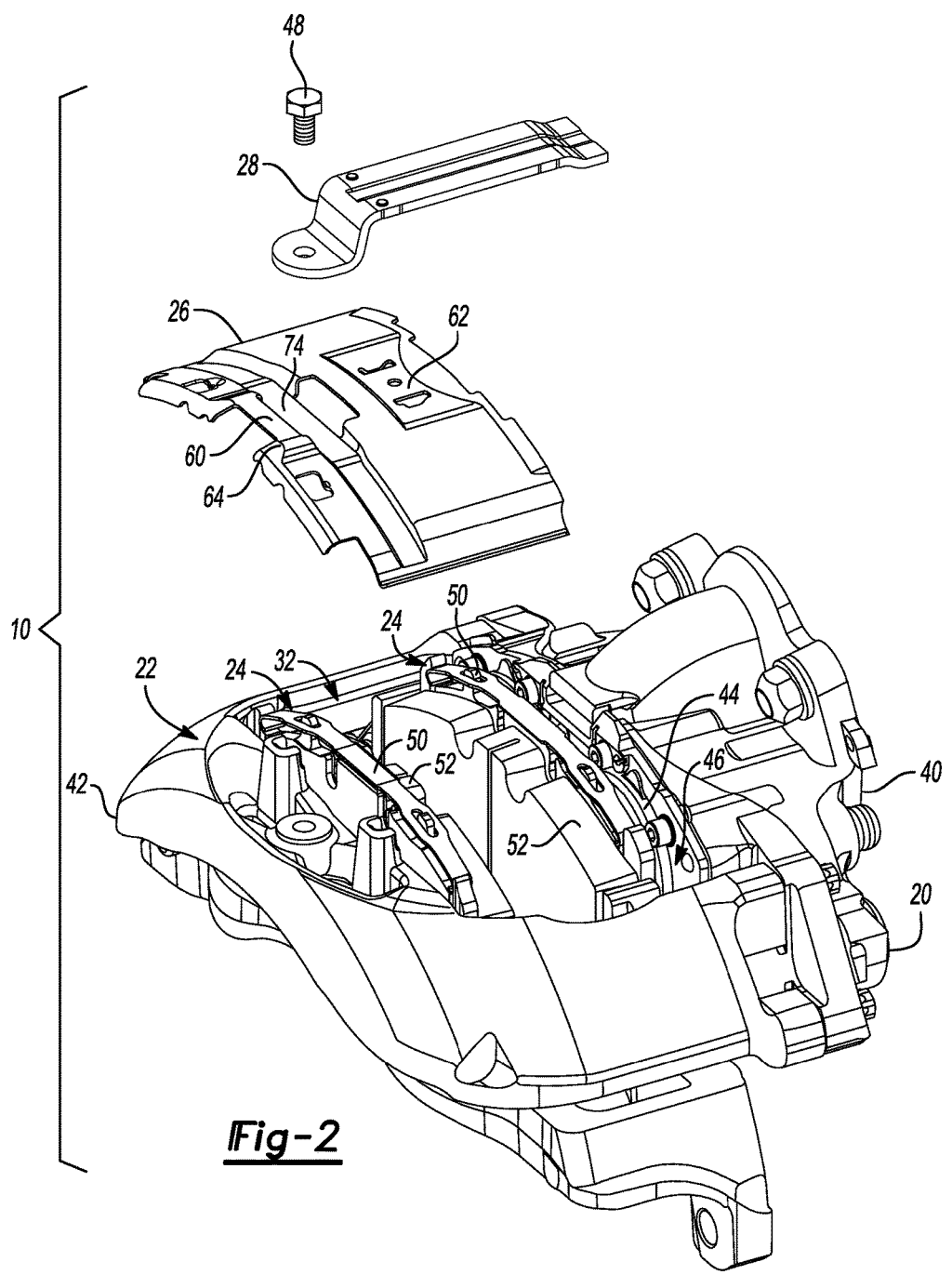
FIG. 2 is a partially exploded view of the brake caliper assembly.

Referring to FIGS. 1 and 2, an exemplary brake caliper assembly 10 is shown. The brake caliper assembly 10 may be provided as part of a vehicle, such as a motor vehicle like a truck, bus, farm equipment, military transport or weaponry vehicle, or cargo loading equipment for land, air, or marine vessels. In at least one embodiment, the brake caliper assembly 10 may include a carrier 20, a housing assembly 22, a plurality of brake pad assemblies 24, a pad shield 26, and a retainer bracket 28.

The carrier 20 may be fixedly mounted to the vehicle. For example, the carrier 20 may be connected to an axle or steering knuckle, such as with an intermediate component like a torque plate in one or more embodiments. The carrier 20 may receive and/or support the brake pad assemblies 24 and may include a rotor opening 32 that may be configured to receive the rotor, also known as a brake disc. As such, the carrier 20 may straddle the rotor and help position the brake pad assemblies 24 on opposite sides of the rotor.

The housing assembly 22 may receive various components of the brake caliper assembly 10. In addition, the housing assembly 22 may facilitate positioning of the brake pad assemblies 24 with respect to the rotor to facilitate braking of the vehicle. In at least one approach, the housing assembly 22 may include a caliper housing 40 and a caliper bridge 42.

The caliper housing 40 may be movably disposed on the carrier 20. For example, the caliper housing 40 may be slidably disposed on a pair of slide pins that may be fixedly disposed on the carrier 20. The caliper housing 40 may receive an actuator 44, such as at least one piston, that may actuate the brake pad assemblies 24 into engagement with the rotor. More specifically, the actuator 44 may actuate a brake pad assembly 24 disposed proximate the caliper housing 40 toward the rotor and move the caliper housing 40 and caliper bridge 42 to actuate the brake pad assembly 24 disposed proximate the caliper bridge 42 toward an opposite side of the rotor. The actuator 44 may be pneumatically actuated in one or more approaches.

The caliper bridge 42 may be integrally formed with or may be fixedly disposed on the caliper housing 40. For example, the caliper bridge 42 may be coupled to the caliper housing 40 with one or more fasteners, such as a bolt. The caliper bridge 42 may cooperate with the caliper housing 40 to at least partially define an opening 46. In at least one approach, the brake pad assemblies 24, pad shield 26, and/or retainer bracket 28 may be at least partially disposed in the opening 46.

The brake pad assemblies 24 may be configured to engage opposite sides of the rotor to slow the rotation of a vehicle wheel. The brake pad assemblies 24 may have similar or identical configurations. In at least one approach, the brake pad assemblies 24 may include a backing plate 50 and a friction material 52. The backing plate 50 may be a structural member of a brake pad assembly 24. The backing plate 50 may be made of any suitable material, such as a metal or metal alloy. The friction material 52 may be disposed on the backing plate 50. The friction material 52 may face toward the rotor and may engage the rotor during vehicle braking.

In at least one approach, the pad shield 26 may extend, partially or completely, across the opening 46. The pad shield 26 may be disposed in the opening 46, may be disposed over the opening 46, or may be disposed in any suitable arrangement. The pad shield 26 may help shield the friction material 52 of the brake pad assemblies 24 from water or contaminants. The pad shield 26 may be made of any suitable material, such as a metal alloy like stainless steel or carbon fiber.

The retainer bracket 28 may secure the pad shield 26 to the housing assembly 22 as is best shown in FIG. 1. The retainer bracket 28 may have a first end that may engage or may be received in a notch in the caliper housing 40 and a second end that may be fixedly disposed on the caliper bridge 42. For example, the second end may receive a fastener 48, such as a bolt, that may couple the retainer bracket 28 to the caliper bridge 42.

Figure 3:
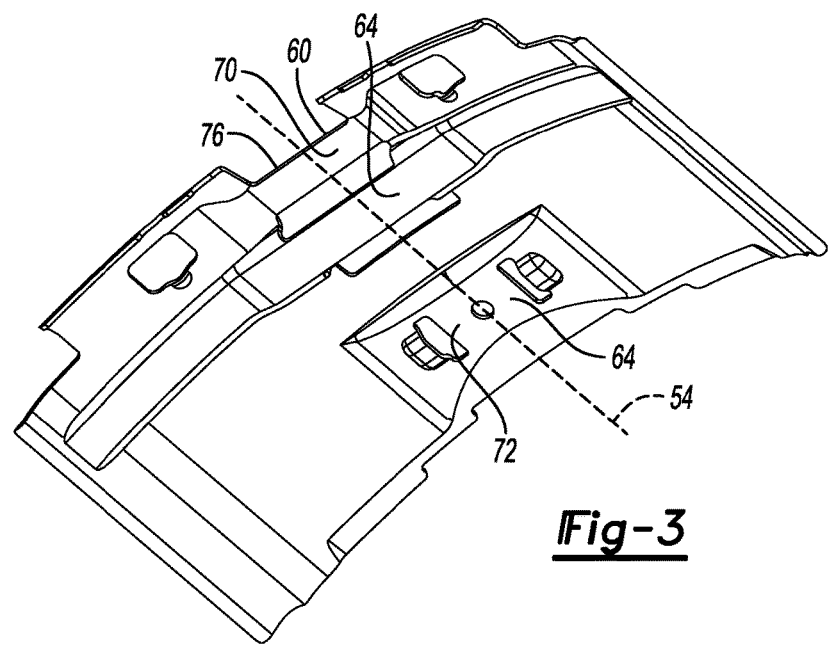
FIG. 3 is a bottom perspective view of a pad shield.

Referring to FIGS. 2 and 3, the pad shield 26 may include a plurality of spans that extend transversely across a central axis 54 of the pad shield 26. For example, the pad shield 26 may include a first span 60, a second span 62, and a third span 64. As shown, the first and second spans 60, 62 may be spaced apart (e.g., not adjacent), and the third span 64 may be disposed between the first and second spans 60, 62.

The spans may include engagement surfaces. For example, the first span 60 may define a first engagement surface 70, the second span 62 may define a second engagement surface 72, and the third span may define a third engagement surface 74. As shown, the first and second engagement surfaces 70, 72 may be spaced apart (e.g., not adjacent), and the third engagement surface 74 may be disposed between the first and second engagement surfaces 70, 72. The first and second engagement surfaces 70, 72 may face toward a brake pad assembly, and the third engagement surface 74 may face away from the brake pad assembly. The engagement surfaces 70, 72, 74 may engage the retainer bracket 28 in the assembled configuration, as discussed in greater detail elsewhere herein.

One or more of the engagement surfaces may be parallel (e.g., extending in non-converging and non-diverging planes). In at least one approach, the first, second, and third engagement surfaces 70, 72, 74 are all parallel. One or more of the engagement surfaces may be coplanar (e.g., extending in the same plane) or may be noncoplanar (e.g., extending in offset planes). For example, the first engagement surface 70 and the second engagement surface 72 may be coplanar, and the third engagement surface 74 may be noncoplanar (e.g., offset) with the first and second engagement surfaces 70, 72. In this way, noncoplanar engagement surfaces may define a receiving path therebetween. As discussed in greater detail elsewhere herein, the retainer bracket 28 may be received in the receiving path.

One or more spans may further define an abutment surface. For example, the first span 60 may define an abutment surface 76 that may be a side wall of the first span 60. In at least one approach, the abutment surface 76 may extend substantially orthogonally from the first engagement surface 70.

Referring now to FIGS. 4-7, a retainer bracket 28 may include a first mount 80, an intermediate portion 82, and a second mount 84 opposite the intermediate portion 82 from the first mount 80. The first mount 80 may be disposed in engagement with the housing assembly 22 (e.g., at or near the caliper bridge 42). The second mount 84 may also be disposed in engagement with the housing assembly 22 (e.g., at or near the caliper housing 40).

The first mount 80 may include a first end surface 86 that may extend from a top surface 88 of the first mount 80 to a bottom surface 90. As used herein, "top," "bottom," and other terms of relative position refer to the orientation shown in FIGS. 1 and 4, in which the Z-direction corresponds to a vertical direction.

The first end surface 86 may be a curved end surface, or may be a flat, planar end surface. The first mount 80 may further include a mating feature 92. The mating feature 92 may be, for example a hole, such as a through-hole, that may receive a fastener (e.g., fastener 48 shown in FIGS. 1 and 2).

A retainer bracket 28 may further include a first step 100 disposed between the first mount 80 and the intermediate portion 82. The first step 100 may include a lower curved wall extending from the first mount 80 and an upper curved wall extending to the intermediate portion 82.

The second mount 84 may include a second end surface 102 that may extend from a top surface 104 of the second mount 84 to a bottom surface 106. The second end surface 102 may be a flat, planar end surface, or may be a curved end surface.

A retainer bracket 28 may further include a second step 110 disposed between the intermediate portion 82 and the second mount 84. The second step 110 may include an upper curved wall extending from the intermediate portion 82 and a lower curved wall extending to the second mount 84.

The intermediate portion 82 may extend between the first mount 80 and the second mount 84 (for example, between the first step 100 and the second step 110). The intermediate portion 82 may extend longitudinally along a central axis 112. The intermediate portion 82 may define a top surface 120, a bottom surface 122, a first lateral side 124 extending between the top surface 120 and the bottom surface 122, and a second lateral side 126 extending between the top surface 120 and the bottom surface 122 opposite the first lateral side 124.

The intermediate portion 82 may define a channel 130. The channel 130 may define a channel depression 132 in the intermediate portion 82 that is offset from the top surface 120, and may form a corresponding channel protrusion 134 in the intermediate portion 82 that is offset from bottom surface 122. The channel depression 132 may define a generally planar depression surface that may be offset approximately 1 millimeter from the top surface 120. The channel protrusion 134 may define a generally planar protrusion surface that may be offset approximately 1 millimeter from the bottom surface 122.

In still another approach, the channel 130 may include a channel depression 132 in the top surface 120 and may not include a channel protrusion 134 extending from the bottom surface 122. In this approach, at least a portion of the bottom surface may be a continuous planar bottom surface. In still another approach, the channel 130 may include a channel protrusion 134 extending from the bottom surface 122 and may not include channel depression 132 in the top surface 120. In this approach, the at least a portion of the top surface may be a continuous planar top surface.

Figure 4:
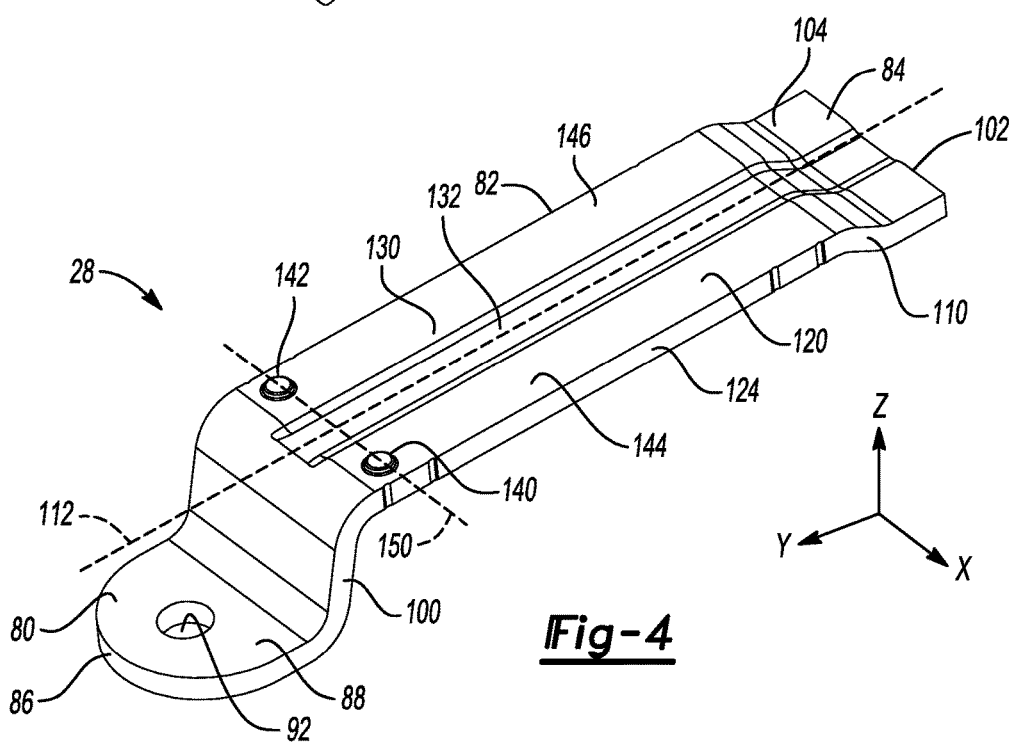
FIG. 4 is a top perspective view of a retainer bracket.
Figure 5:
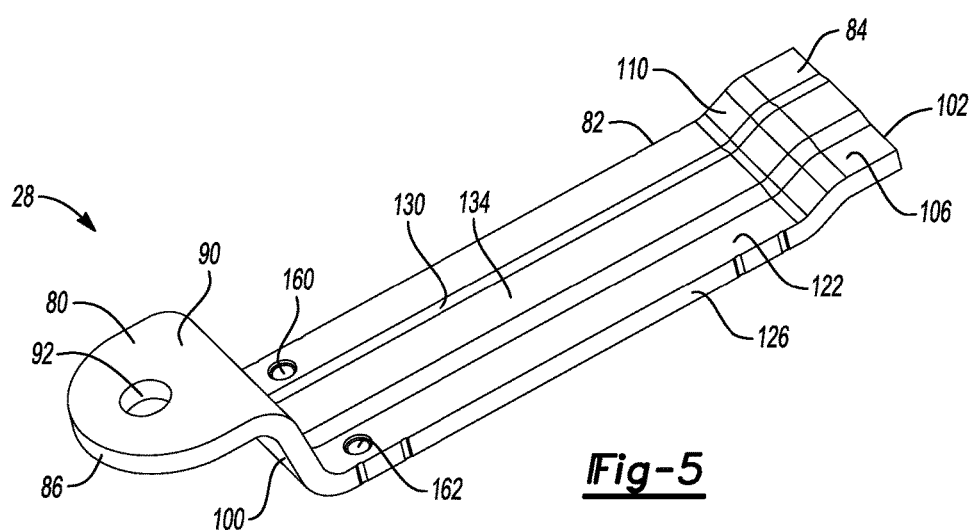
FIG. 5 is a bottom perspective view of the retainer bracket.
Figure 6:
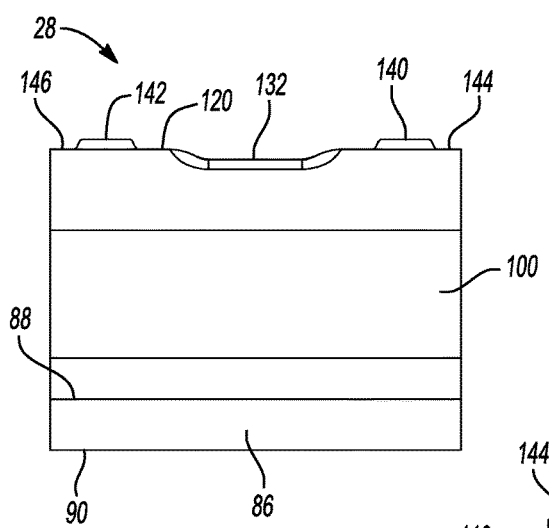
FIG. 6 is a first side elevation view of the retainer bracket.
Figure 7:
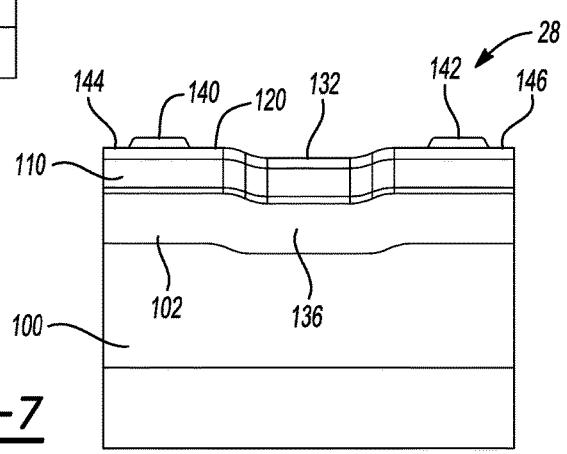
FIG. 7 is a second side elevation view of the retainer bracket.

The channel 130 may extend longitudinally along at least a portion of the intermediate portion 82; for example, along the central axis 112. In at least one approach, the channel 130 may extend to the first step 100 (e.g., to a curved wall portion of the first step 100), as shown in FIGS. 4 and 6. The channel 130 may also extend to the second step 110 (e.g., to a curved wall portion of the second step 110). The channel 130 may also extend through the second step 110, may extend through the second mount 84, and may extend to the second end surface 102, as shown in FIGS. 4, 5, and 7. In this way, the second end surface 102 may define a generally U-shaped central end surface portion 136, as shown in FIG. 7. The generally U-shaped central end surface portion 136 may be symmetrical about a central axis.

The channel 130 may increase torsional rigidity of at least a portion of the retainer bracket 28. As such, the channel 130 may be referred to as a rib or a stiffening rib.

The retainer bracket 28 may further include at least one protrusion. As shown, for example, in FIG. 4, the retainer bracket 28 may include two protrusions extending from the intermediate portion 82. More particularly, the retainer bracket 28 may include a first protrusion 140 extending from a first lateral region 144 of the top surface 120, and a second protrusion 142 extending from a second lateral region 146 of the top surface 120. The second protrusion 142 may be disposed opposite the channel 130 from the first protrusion 140. In at least one approach, the first and second protrusions 140, 142 may be disposed on an axis 150 that extends orthogonal to the central axis 112. The first and second protrusions 140, 142 may be disposed adjacent the first step 100. The first and second protrusions 140, 142 may be spaced substantially equidistant from the central axis 112.

The first and second protrusions 140, 142 may have the same shape, or may have different shapes. In at least one approach, the first and second protrusions 140, 142 may be generally frusto-conical protrusions. In this way, the first and second protrusions 140, 142 may have tapered side walls. The first and second protrusions 140, 142 may extend approximately 1 millimeter from the top surface 120.

In addition to the protrusions 140, 142, the retainer bracket may include at least one depression. As shown, for example, in FIG. 5, the retainer bracket 28 may include two depressions extending into the intermediate portion 82. More particularly, the retainer bracket 28 may include a first depression 160 extending into the intermediate portion 82, and a second depression 162 extending into the intermediate portion 82. The first and second depressions 160, 162 may be disposed opposite the first and second protrusions 140, 142, respectively.

The pad shield 26 and retainer bracket 28 may cooperate to exert a load force against the brake pad assemblies 24. More specifically, the retainer bracket 28 may exert force on the pad shield 26, which in turn may exert force on the brake pad assemblies 24 to help position the brake pad assemblies 24 within the housing assembly 22 and inhibit movement toward or away from the pad shield 26 to help improve friction material life and reduce noise. Such a configuration may allow brake pad springs to be omitted from the brake caliper assembly 10.

Figure 8:
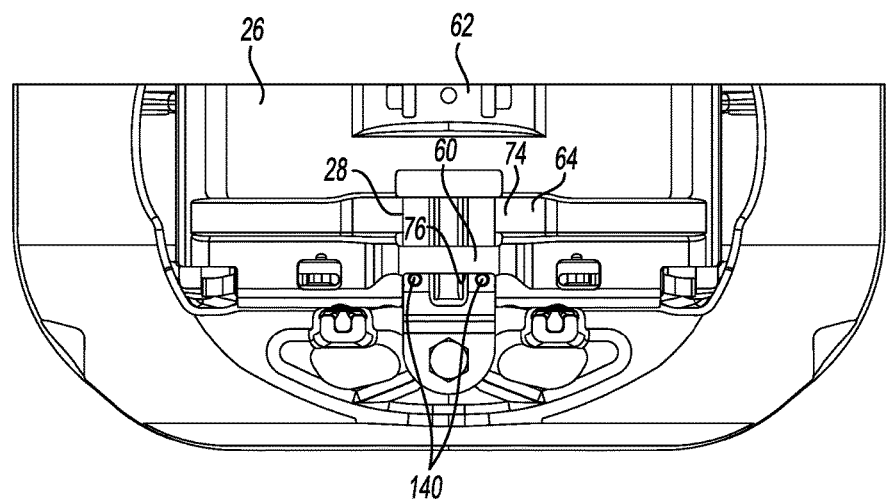
FIG. 8 is a partial top plan view of a portion of the brake caliper assembly.
Figure 9:
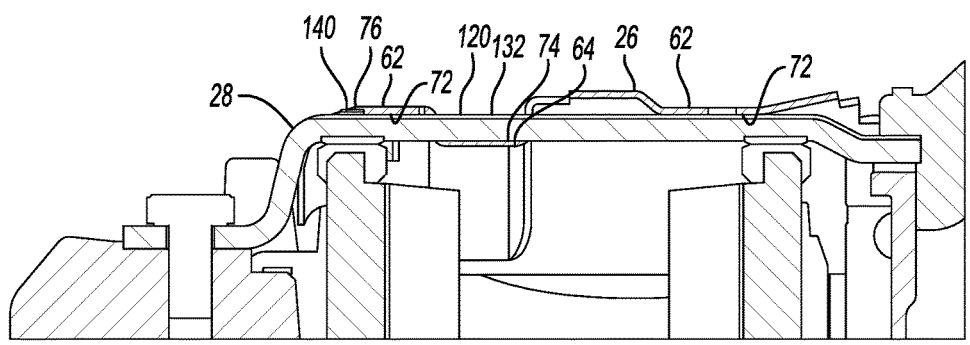
FIG. 9 is a partial cross-section view of a portion of the brake caliper assembly.

Referring now to FIGS. 8 and 9, the pad shield 26 may receive the retainer bracket 28 in an assembled, or partially assembled configuration. In the assembled configuration, the intermediate portion 82 of the retainer bracket 28 may be disposed in engagement with the first, second, and third engagement surfaces 70, 72, 74. More particularly, the top surface 120 of the intermediate portion 82 may engage the first and second engagement surfaces 70, 72, and the channel protrusion 134 may engage the third engagement surface 74. The channel depression 132 may be spaced apart from the first and second engagement surfaces 70, 72. In this way, the retainer bracket 28 may be slid into engagement with, and frictionally held, by the pad shield 26.

The protrusions 140 may be disposed on the retainer bracket 28 to limit an axial depth along which the retainer bracket 28 may be slid into engagement with the pad shield 26. More particularly, the retainer bracket 28 may be slid such that the intermediate portion 82 slides along the engagement surfaces 70, 72, 74 until the protrusions 140 engage a portion of the pad shield. As shown in FIGS. 8 and 9, the protrusions 140 may engage the abutment surface 76 of the first span 60. As the protrusions 140 may be generally frusto-conical in shape, angled side surfaces of the protrusions may engage, and extend at an angle relative, to the abutment surface 76.

Engagement of the protrusions 140 and the abutment surface 76 may limit the axial depth along which the retainer bracket 28 may be slid into engagement with the pad shield 26. In this way, the mating feature 92 of the first mount 80 may be properly aligned with a mating feature of the housing assembly 22.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A retainer bracket for a brake caliper assembly, comprising:
   a first mount having a first end surface;
   a second mount having a second end surface;
   an intermediate portion extending between the first and second mounts, the intermediate portion including:
      a channel that extends longitudinally along a central axis of the intermediate portion, the channel forming a channel depression in a top surface of the intermediate portion and an opposing channel protrusion in a bottom surface of the intermediate portion;
      a first protrusion disposed at a first lateral region of the intermediate portion and extending from the top surface; and a second protrusion disposed at a second lateral region of the intermediate portion opposite the channel from the first protrusion.

2. The retainer bracket of claim 1 wherein the first and second protrusions are disposed on an axis that extends orthogonally to the central axis.

3. The retainer bracket of claim 1 wherein the first and second protrusions are frusto-conical protrusions.

4. The retainer bracket of claim 1 wherein the first and second protrusions are spaced equidistant from the central axis.

5. The retainer bracket of claim 1 wherein the intermediate portion further defines a first depression in the bottom surface opposite the first protrusion and a second depression in the bottom surface opposite the second protrusion.

6. The retainer bracket of claim 1 further comprising a first step that extends from the first mount to the intermediate portion, wherein the channel extends to the first step.

7. The retainer bracket of claim 6 wherein the first and second protrusions are disposed adjacent to the first step.

8. The retainer bracket of claim 6 wherein the channel protrusion extends from the second end surface to the first step.

9. The retainer bracket of claim 6 further comprising a second step that extends from the intermediate portion to the second mount, wherein the channel extends along the second step and the second mount.

10. The retainer bracket of claim 9 wherein the channel extends to the second end surface.

11. The retainer bracket of claim 10 wherein the second end surface includes a generally U-shaped central end surface portion that is symmetrical with respect to the central axis.

12. The retainer bracket of claim 1 wherein the first lateral region is spaced apart from the second lateral region.

13. A brake caliper assembly comprising:
a housing assembly having an opening;
a brake pad assembly disposed in the opening;
a pad shield extending across the opening, the pad shield including:
a first span that is disposed in the opening and that has a first engagement surface that faces toward the brake pad assembly;
a second span that is disposed in the opening and is spaced apart from the first span, the second span having a second engagement surface that faces toward the brake pad assembly; and
a third span that is disposed between and is spaced apart from the first span and the second span, the third span having a third engagement surface that faces away from the brake pad assembly; and
a retainer bracket that secures the pad shield to the housing assembly, wherein the retainer bracket engages the first, second, and third engagement surfaces.

14. The brake caliper assembly of claim 13 wherein the second engagement surface is coplanar from the first engagement surface.

15. The brake caliper assembly of claim 13 wherein the third engagement surface is disposed parallel the first span and the second span and is not coplanar with the first span and the second span.

16. The brake caliper assembly of claim 13 wherein the retainer bracket includes a first protrusion that contacts the first span to inhibit movement of the pad shield relative to the retainer bracket.

17. The brake caliper assembly of claim 16 wherein the first protrusion extends away from the brake pad assembly.

18. The brake caliper assembly of claim 17 wherein the retainer bracket further comprises a second protrusion that contacts the first span and a channel that extends between the first protrusion and the second protrusion.

19. The brake caliper assembly of claim 18 wherein the first and second protrusions are spaced apart from the channel.

20. The brake caliper assembly of claim 18 wherein the channel is spaced apart from the first span and the third span.

* * * * *